United States Patent Office

3,221,069
Patented Nov. 30, 1965

3,221,069
DECOMPOSITION OF AROMATIC CARBOXYLIC ACID HALIDES
Peter James Stratford Bain, Wrexham, and Ernest Bryson McCall, Llangollen, Wales, assignors to Monsanto Chemicals Limited, London, England, a British company
No Drawing. Filed Jan. 28, 1963, Ser. No. 254,455
Claims priority, application Great Britain, Feb. 8, 1962, 4,859/62
5 Claims. (Cl. 260—650)

This invention relates to a new process by which a halogen atom can be introduced into an aromatic compound.

The introduction of a halogen atom, such as a chlorine atom, into an aromatic nucleus does, in principle, constitute an important reaction, and halogeno-substituted aromatic compounds have a wide variety of uses.

The halogenation reaction that has now been discovered provides a valuable new route to many halogenated aromatic compounds that are otherwise rather inaccessible, and is an improvement in or modification of the invention described in copending application Serial No. 219,756, filed August 27, 1962.

The process of the invention is one for the production of a halogeno-substituted aromatic compound, in which an aromatic carboxylic acid halide is subjected to thermal decomposition such that carbon monoxide is evolved from a halogenocarbonyl group, and the halogen atom appears as a substituent in the aromatic nucleus.

For instance, by the process of the invention, m-dichlorobenzene can be obtained in good yield from the readily obtainable isophthaloyl chloride.

Certain materials have been found to catalyze the thermal decomposition of the aromatic carboxylic acid halide, and preferably the process of the invention is carried out in the presence of one of these.

In general, the aromatic carboxylic acid halide that is employed as starting material is a compound having a halogenocarbonyl group linked to an aromatic nucleus; that is, to a cyclic system which is stabilized by the presence of non-localized π-electrons, for instance, a benzene, diphenyl, naphthalene, benzofuran, thiophene or pyridine nucleus. Preferably the nucleus to which the halogenocarbonyl group is linked is carbocyclic.

By using the appropriate acid halide, a chosen halogen atom can be introduced; for instance, an acid chloride leads to the introduction of a chlorine atom; an acid bromide to a bromine atom; an acid iodide to an iodine atom; and an acid fluoride to a fluorine atom. The process is particularly useful for the production of chlorine-substituted and fluorine-substituted aromatic compounds.

Similarly, a mono-, di-, tri- or other halogeno-substituted aromatic compound can be obtained by use of a mono-, di-, or other appropriate carboxylic acid halide. The halogen atom normally takes the position formerly occupied by the halogenocarbonyl group. The process is useful in the production of di-halogeno compounds from dicarboxylic acid halides, and is particularly valuable in the production of m-di-halogeno compounds because these are not accessible by direct halogenation, and yields by other routes tend to be low.

The process is normally carried out at an elevated temperature, for example a temperature higher than 200° C., and preferably above 250° C. Good results are obtained using a reaction temperature in the range of 300° C. to 400° C., for instance, between 340° C. and 380° C.

The reaction can be carried out in a liquid phase or vapor phase, although the latter is generally more convenient to operate.

Materials that are effective as catalysts in the process are palladium, platinum and nickel, and their compounds, for example their oxides or salts, for instance the halides. In general, the catalyst can be selected from the same range of materials whether a liquid phase or vapor phase process is employed.

Where a liquid phase process is employed, superior results are often obtained using a solution of the carboxylic acid halide in a suitable solvent rather than the carboxylic acid halide alone, and, in this connection, a suitable solvent is usually one which is substantially inert to free radical attack and of high boiling point, for instance, pentachlorobenzene, hexachlorobenzene and the highly chlorinated diphenyls. The requirement as to reaction temperature may mean, in certain instances, that the thermal decomposition of the carboxylic acid halide needs to be carried out at an elevated pressure.

Where a vapor phase process is employed, this is normally operated at atmospheric pressure, so that the reaction temperature will usually be above the normal boiling point of the aromatic carboxylic acid halide. In most instances, this follows also from the relatively high reaction temperature required. Good results are obtained by diluting the vapor of the acid halide with an inert gas, for example nitrogen or argon, before subjecting it to thermal decompoistion. There can be employed, for example, from 1 to 10 volumes of the inert gas per volume of the acid halide vapor, for instance from 3 to 5 volumes. A catalyst, if used, is generally employed in a form that is previous to vapor, and in many instances can conveniently be absorbed on an inert support, for example charcoal or kieselguhr, in powder or granular form.

Often the thermal decomposition of the aromatic carboxylic acid halide can, with advantage, be conducted in the presence of the corresponding free halogen. For example, during a liquid phase decomposition of an acid chloride, chlorine gas can be bubbled through the liquid; or in a vapor phase decomposition of an acid fluoride, fluorine can be added to the vapor which is subjected to the appropriate elevated temperature.

By the process of the invention, there can be produced halogeno derivatives of carbocyclic compounds such as benzene, diphenyl, and condensed benzenoid systems such as naphthalene. Preferably, as has been stated, the halogenocarbonyl group, or each such group, is substituted in a carbocyclic aromatic nucleus, although this can, if desired, be fused to a heterocyclic aromatic nucleus, as, for example, in a 2-dibenzofuroyl halide. The process can also be used for the production of halogeno derivatives of aromatic compounds in which the aromatic nucleus is present as a radical (for example, an esterifying radical) such as a phenyl or naphthyl radical.

In general, the aromatic compound can contain a substituent that was present in the original carboxylic acid halide and has been carried through unchanged into the product, for example an aliphatic group, for instance an alkyl or cycloalkyl group, such as a methyl, octyl or cyclohexyl group; a halogen atom, for example fluorine, chlorine or bromine; a nitro group; a carboxylic ester group; an alkoxy group, for instance a methoxy, ethoxy, butoxy or hexyloxy group; or an aryloxy group, for instance a phenoxy or tolyoxy group. Further specific examples of aromatic compounds in which a halogen atom can replace a halogenocarbonyl group are toluene, the xylenes, ethylbenzene, dodecylbenzene, 4 - isopropyldiphenyl, 1-methylnaphthalene, indene, anthracene, chlorobenzene, fluorobenzene, nitrobenzene, o-nitrotoluene, anisole, diphenyl ether, diphenylamine, phenyl benzoate, tetraphenyl orthosilicate, 2-phenylthiophene, benzofuran, 1-phenyldibenzofuran, 1-cyclohexyldibenzothiophene, and 2-phenyldibenzothiophene.

Specific halogeno compounds that can be produced by the process of the invention, starting as has been described from an appropriate carboxylic acid halide, include chlorobenzene, bromobenzene, fluorobenzene, m-dichlorobenzene, m-dibromobenzene, m-chlorobromobenzene, m-difluorobenzene, p-chlorofluorobenzene, o-bromotoluene, m-chlorotoluene, m-iodoethylbenzene, p-chlorodiphenyl, m-bromodiphenyl, 2-bromonaphthalene, 5-bromobenzofuran, 4-bromodibenzothiophene, 1,5-dichloronaphthalene, 2,7-dibromonaphthalene and p-difluorobenzene.

The required halogen derivatives can be isolated from the products of the thermal decomposition in one of the conventional ways, for example, by fractional condensation or distillation. Under certain conditions, some of the acid halide can be recovered unchanged, and, if desired, can be recycled to the process.

In a liquid phase process, the required product is preferably removed from the reaction mixture as it is formed. This can be arranged by means of a suitable condensing system at an appropriate temperature such that the vapor of the starting material is condensed and returned to the reaction vessel while the vapor of the product distills off and is condensed and collected in a separate receiver.

The process of the invention is illustrated by the following examples:

Example 1

This example describes the production of chlorobenzene by the thermal decomposition of benzoyl chloride in the presence of a palladium catalyst.

Benzoyl chloride was vaporized at 0.125 gram per minute into a stream of dry nitrogen flowing at 30 cc. per minute. The gases were led through a U-tube having an internal diameter of 1.9 cm. and containing 19 grams of dry powered charcoal on which was absorbed 5% of its weight of palladium, thus giving a catalyst bed 18 cm. in length. The U-tube was immersed in a bath containing a heat-transfer fluid at a temperature of 365° C.

The gas stream emerging from the U-tube was led successively through a water-cooled condenser, an ice-cooled receiver and a scrubber containing water. The less volatile components collected in the receiver; hydrogen chloride, a minor by-product of the reaction, was absorbed in the water; while carbon monoxide, the principal by-product, was allowed to escape to atmosphere.

A total of 16.2 grams of benzoyl chloride was vaporized (over a period of 130 minutes). Nitrogen alone was then passed through the apparatus for a further 30 minutes.

By distillation of the liquid that had collected in the receiver, there were obtained 9.7 grams (equivalent to 75% of the benzoyl chloride vaporized) of chlorobenzene having a boiling point of 128–131° C.

Example 2

This example describes the production of chlorobenzene by the thermal decomposition of benzoyl chloride in the presence of a nickel catalyst.

The apparatus and procedure were essentially the same as those described in Example 1. As catalyst there were employed 19.0 grams of dry powdered charcoal on which was absorbed 5% of its weight of nickel.

The yield of chlorobenzene was 6.5 grams, equivalent to 50% of the benzoyl chloride vaporized.

Example 3

This example describes the production of m-dichlorobenzene from isophthaloyl chloride.

The apparatus and procedure were essentially the same as those described in Example 1. As catalyst there were employed 19.0 grams of the palladium on charcoal catalyst of Example 1 (giving a catalyst bed 18 cm. in length) maintained at a temperature of 355–360° C. A total of 14 grams of isophthaloyl chloride was vaporized over a period of 90 minutes into nitrogen flowing at 30 cc. per minute.

From the products of the thermal decomposition, 6.8 grams of m-dichlorobenzene (68% of the theoretical yield) were isolated.

Examples 4–8

Following the detailed procedures set forth in the preceding examples, and employing the apparatus described therein, the aromatic carboxylic acid halides hereinafter named were subjected to thermal decomposition to yield the named halogeno-substituted aromatic compounds.

Example 4

Halide: benzoyl fluoride
Product: fluorobenzene

Example 5

Halide: p-toluoyl bromide
Product: p-bromotoluene

Example 6

Halide: dimethylbenzoyl chloride
Product: chloroxylene

Example 7

Halide: α-naphthoyl fluoride
Product: α-fluoronaphthalene

Example 8

Halide: phthaloyl bromide
Product: o-dibromobenzene.

While the invention has been described herein with regard to several specific embodiments, it is not so limited. It is to be understood that modifications and variations of the invention, obvious to those skilled in the art, may be made without departing from the spirit and scope of said invention.

What is claimed is:

1. A process which comprises heating, at a temperature of from about 200° C. to about 400° C. and in the presence of a palladium catalyst, an aromatic carboxylic acid halide of the formula,

wherein $n$ is an integer from 1 to 3, X represents halogen, and R is selected from the group consisting of phenyl, naphthyl, biphenylyl and the alkyl, alkoxy and phenoxy substituted derivatives thereof.

2. A process as defined in claim 1 wherein said temperature is from about 300° C. to about 400° C.

3. A process as defined in claim 1 wherein R is phenyl, and $n$ is 1.

4. A process as defined in claim 1 wherein R is phenyl, and $n$ is 2.

5. A process as defined in claim 1 wherein the halide is in vapor phase, and is diluted with an inert gas prior to heating.

References Cited by the Examiner

Erlenmeyer: "Helv. Chim. Acto, vol. 16, page 903 (1933).

Mailhe: "Compt. rend.," vol. 180, pages 1111–1113 (1925).

LEON ZITVER, *Primary Examiner.*